United States Patent [19]

Koetje

[11] Patent Number: 4,532,747
[45] Date of Patent: Aug. 6, 1985

[54] EXPANDABLE CONNECTOR AND METHOD OF USING SAME TO FORM CURVED STRUCTURAL FRAMEWORK

[76] Inventor: John R. Koetje, 1314 McLean Rd., Mount Vernon, Wash. 98273

[21] Appl. No.: 459,326

[22] Filed: Jan. 20, 1983

[51] Int. Cl.$^3$ .............................................. E04C 1/10
[52] U.S. Cl. ...................................... 52/586; 29/507; 29/523; 52/730; 52/590
[58] Field of Search .................. 52/586, 590, 730, 731; 404/40; 29/507, 522 R, 523

[56] References Cited

U.S. PATENT DOCUMENTS

| | | | |
|---|---|---|---|
| 2,225,612 | 12/1940 | Allen | 52/586 |
| 2,870,881 | 1/1959 | Rogge . | |
| 3,490,800 | 1/1970 | Wissler | 52/730 |
| 3,960,637 | 6/1976 | Ostrow | 52/730 |
| 4,211,179 | 7/1980 | Saunders | 52/731 |

FOREIGN PATENT DOCUMENTS

| | | | |
|---|---|---|---|
| 132505 | 3/1933 | Austria | 404/40 |
| 0007496 | 2/1980 | European Pat. Off. | 52/730 |
| 2028690 | 12/1970 | Fed. Rep. of Germany | 52/731 |
| 80065 | 2/1919 | Switzerland | 52/590 |
| 660242 | 10/1951 | United Kingdom | 52/730 |

Primary Examiner—Henry E. Raduazo
Attorney, Agent, or Firm—Christensen, O'Connor, Johnson & Kindness

[57] ABSTRACT

A structural framework (20) is constructed from primary members (22) that are interconnected in adjacent side-by-side relationship by an expanable, unitary fastener member (26) receivable within the aligned slots (28) formed in the primary members (22). The fastener members (26) are enlargeable to occupy the entire volume of the primary member slots (28) to securely lock the primary members together. The primary members (22) may be secured together to form a frame structure (20) in a desired shape since the swaging effect imposed on the fastener members when they are enlarged causes the fastener members to retain the shape of the primary members (22).

6 Claims, 9 Drawing Figures

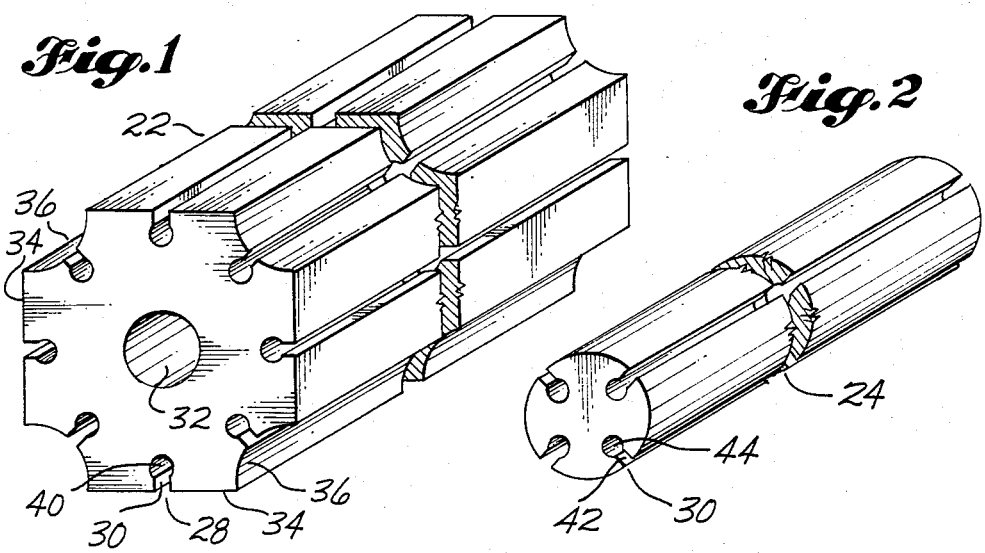
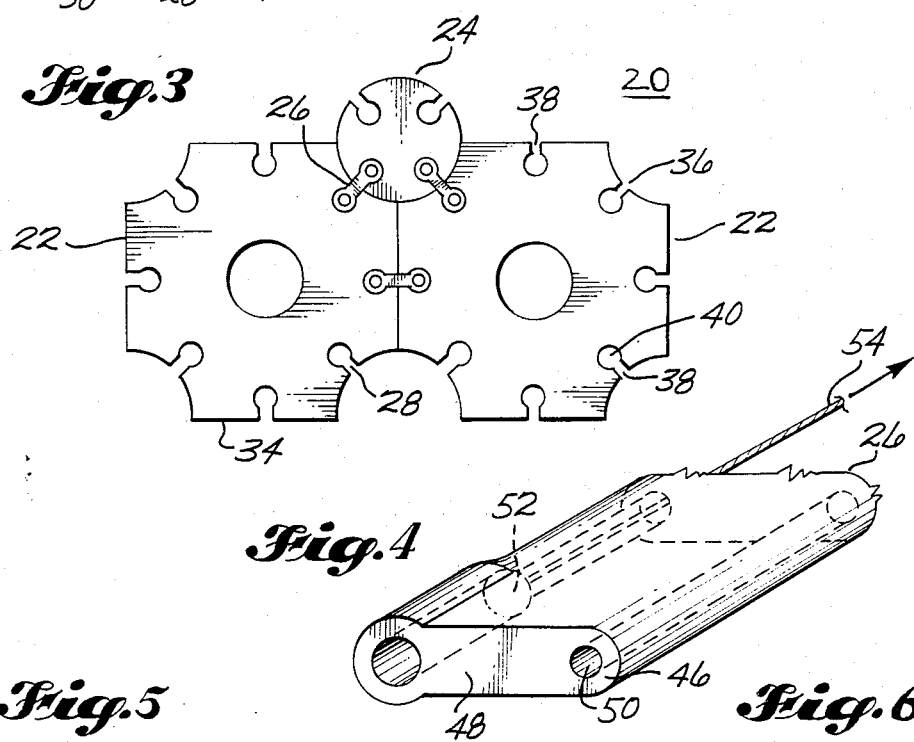
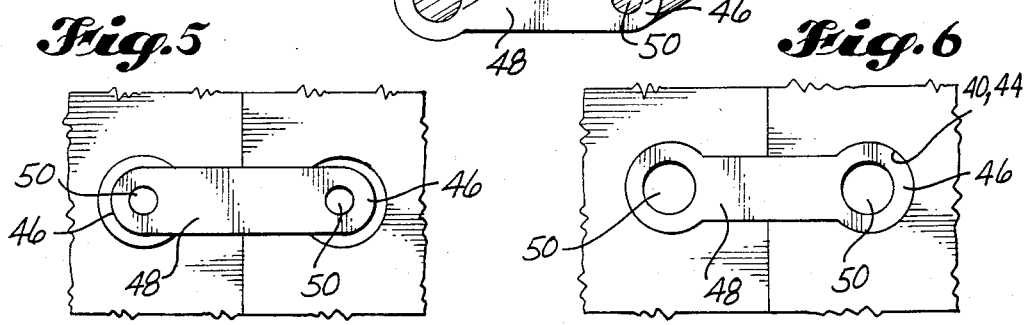

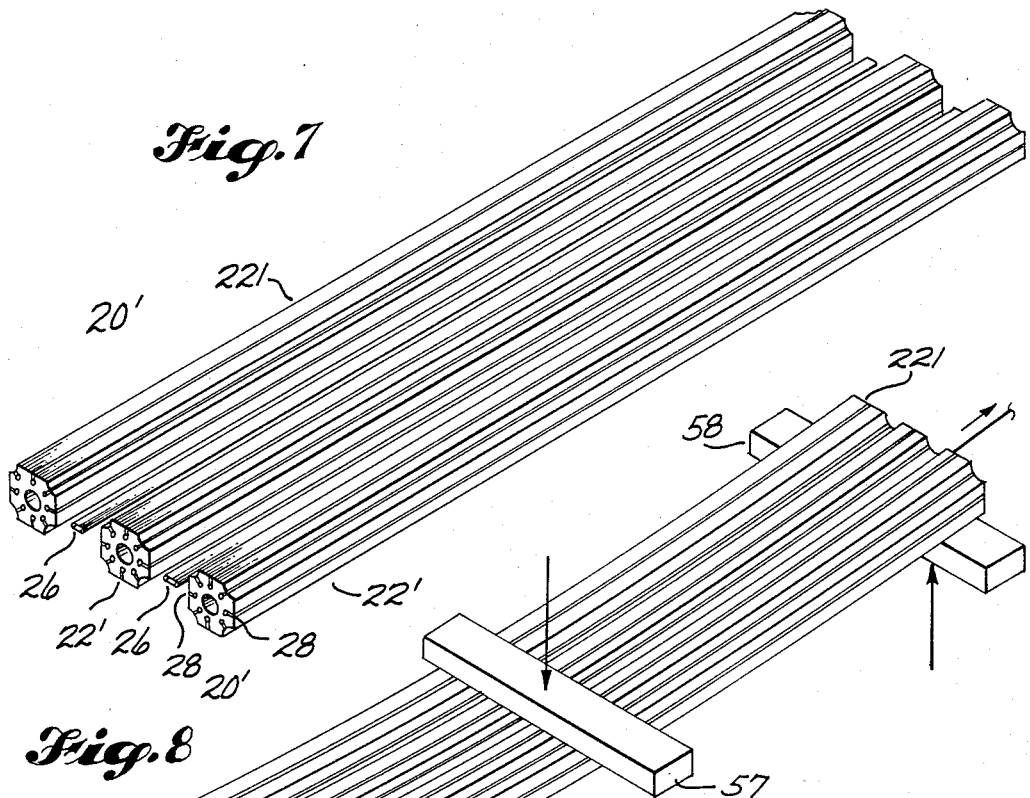
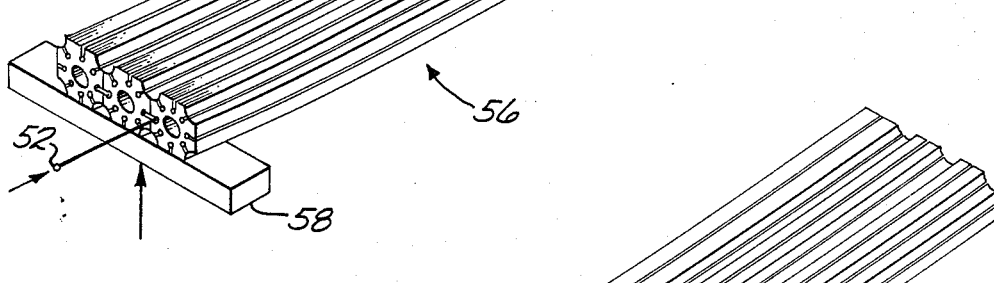
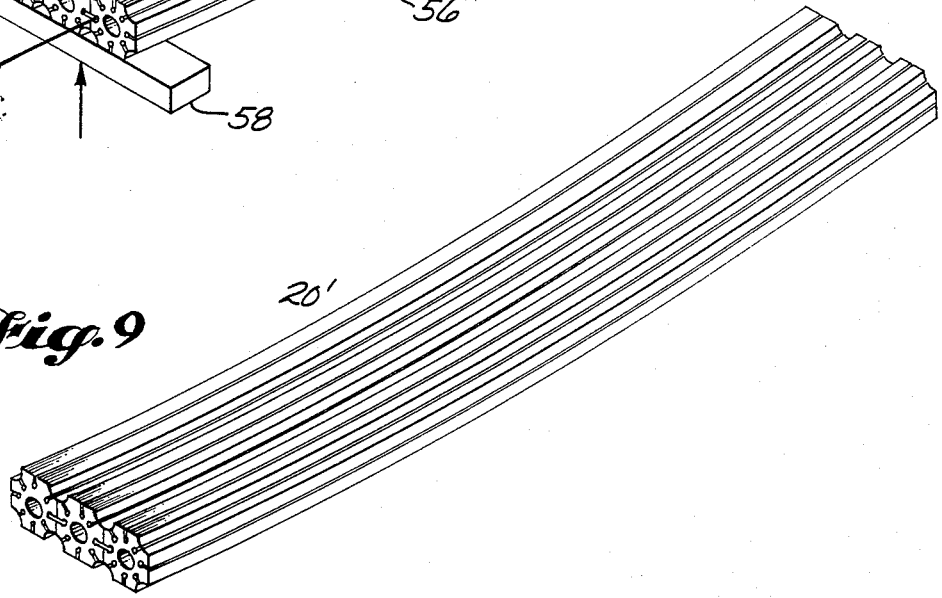

EXPANDABLE CONNECTOR AND METHOD OF USING SAME TO FORM CURVED STRUCTURAL FRAMEWORK

TECHNICAL FIELD

The present invention relates to expandable connectors, and more particularly to an expandable connector for interconnecting straight structural members and for interconnecting and maintaining in desired shape, nominally straight structural members that have been curved or bent into a specific form.

BACKGROUND ART

A fastener for securing two structural members together in edge-to-edge relationship is disclosed in U.S. Pat. No. 2,863,185, wherein the connector is composed of short lengths of hollow shells or bodies of deformable, soft metal or alloy. The bodies include a relatively thick, rigid cross-member or web and integral sidewalls disposed in generally parallel relationship on opposite sides of the cross-member to form, in cross section, a generally H-shape. The outer edges of the sidewall members are integrally joined together by two planar end sections or panels that converge toward each other in the direction outward of the sidewall members. The combined width of the two end panels is greater than the width of the web.

The fastener is engaged with aligned dovetail-shaped slots formed in the edge portions of planks or structural members desired to be fastened together. The nominal overall width of the fastener is greater than the combined depths of the two aligned slots so that as the planks are pushed toward each other, the end panels of the connector are forced to flatten out so that they lie tightly against the base of the dovetail-shaped slots. A drawback of this particular type of fastener is that the structural members to be fastened together must be forced sideways together, which may not always be possible. Another limitation of this particular type of fastener is that the planar construction of the end panels does not allow the fastener to be used to interconnect together curved members.

U.S. Pat. No. 2,870,881 discloses a joint structure specially adapted for joining together two sheet metal members. The joint structure includes angle-shaped flanges that are attached to the edge portions of the sheet metal members desired to be fastened together. Each flange includes a slot in alignment with the slot of the opposite flange. Each slot is formed with an enlarged, generally triangularly shaped undercut portion. A pipe section, which has been flattened into a generally oval shape, is initially engaged within the two aligned slots of the flange members, with the flange members disposed in side-by-side abutting relationship. The pipe section is then hydraulically expanded to assume the shape of the flange slots.

SUMMARY OF THE INVENTION

The structural framework of the present invention includes elongate primary members that are interconnected in adjacent, side-by-side relationship by an expandable, unitary fastener member. The primary structural member includes a plurality of slots extending along its length, with at least one of such slots in opposed alignment with a slot of an adjacent primary structural member. Each slot is formed with a mouth portion that extends inwardly from the outer surface of the primary member to intersect with a generally circular, larger base portion. The fastener member is receivable within aligned slots of adjacent primary members and then expandable to conform to the shape of the slots, thereby to fixedly secure the primary members together. The fastener members are oblong in cross section, having hollow circular end portions separated by a solid central portion. A circular bore extends through the lengths of the two end portions of the fastener member. The circular end portions of the fastener member are enlargeable to occupy the entire diameter of the base portions of the primary structural member slots.

According to a further aspect of the present invention, the primary members may be used to construct a structural framework in a desired arcuate or formed shape. To this end, once fastener members have been inserted into the aligned slots of adjacent primary structural members, the primary members are placed within a jig to flex the structural members into a desired shape. Thereafter, a mandrel is pulled through the bores of the fastener members to enlarge the end portions of the fastener members to occupy the entire volume of the base portions of the slots of the structural members. This swaging of the fastener members causes them to take on a permanent set, thereby permanently forming the fastener members in a curvature corresponding to the shape of the primary structural members. As a result, when the primary structural members are removed from the jig, they are not only rigidly fastened together, but also maintained in substantially the same shape in which they were held in the jig. Thus, by the present invention, the primary structural members are fastened together to form a frame structure of a desired shape while avoiding the high stress concentrations and warpage that would result if the structural members were instead welded together.

In another aspect of the present invention, the primary structural members are constructed with planar side surfaces and arcuate recesses that extend along the length of the primary members at the intersection of adjacent planar side surfaces. The recesses of adjacent primary structural members are disposed in complementary relationship to each other to enable the recesses to cooperatively receive a secondary structural member therein. At least one slot extends along the length of each recess of each primary member. Correspondingly, the secondary structural members are formed with a plurality of slots disposed in alignment with a slot extending along the recess of a primary structural member. An expandable fastener member is receivable within the aligned slots of the primary and secondary structural members in the same manner in which the fastener member is receivable within the aligned slots of a pair of primary structural members. The hollow, circular end potions of the fastener members are enlargeable to occupy the entire volume of the base portions of these slots, thereby rigidly fastening the secondary structural members to the primary structural members. It will be appreciated that by this construction, the secondary structural members serve to both interconnect a plurality of primary structural members and also to reinforce the primary structural members.

BRIEF DESCRIPTION OF THE DRAWINGS

The details of typical embodiments of the present invention will be described in connection with the accompanying drawings, in which:

FIG. 1 is an isometric view of a primary member utilized in the construction of the structural framework of the present invention;

FIG. 2 is an isometric view of a secondary member utilized in the construction of the structural framework of the present invention;

FIG. 3 is an end view of one configuration of a structural framework of the present invention utilizing the structural members illustrated in FIGS. 1 and 2;

FIG. 4 is an enlarged, fragmentary, isometric view of a fastener member utilized to inteconnect the structural members illustrated in FIGS. 1 through 3 and specifically illustrates a mandrel being drawn through the fastener member to enlarge the fastener member;

FIG. 5 is an enlarged, fragmentary end view showing the fastener member of FIG. 4 inserted within the slots of two structural members to be interconnected together;

FIG. 6 is a view similar to FIG. 5, but with the fastener member enlarged to occupy the entire volume of the structural member slots;

FIG. 7 is a schematic, isometric, exploded view illustrating the structural framework components to be fastened together;

FIG. 8 is a schematic, isometric view illustrating the structural members of FIG. 7 placed within a jig to flex the structural members into desired shape and a mandrel being drawn through the bores of the fastener members; and FIG. 9 is an isometric view illustrating the structural framework components interconnected together and formed into final shape after removal from the jig illustrated in FIG. 7.

DETAILED DESCRIPTION

Referring initially to FIGS. 1–3, a structural framework 20 constructed according to the best mode of the present invention currently known to applicant is illustrated as including primary members 22 and complementary-shaped secondary members 24 that are interconnected together by expandable fastener members 26 that engage within aligned slots 28 and 30 formed in primary members 22 and secondary members 24, respectively. Once fastener members 26 have been placed within slots 28,28 or 28,30, the fastener members are enlarged to occupy the entire volume of the slots, thereby securely interconnecting primary members 22 with each other and with secondary members 24. By this construction, structural frameworks for any number of possible uses, such as for a ship hull, a truck trailer, or a building, may be assembled without welds or bolts and in desired shapes, as discussed more fully below.

Continuing to refer specifically to FIGS. 1 and 2, primary members 22 are illustrated as being elongate and generally square in cross section. To reduce the weight of primary members 22, preferably, a circular bore 32 extends centrally through the length of the primary members. Bore 32 is sized to reduce the weight of the primary members without significant reduction of the bending or column load-carrying capacity of the primary members. It is to be understood that circular bore 32 could be replaced with a bore formed in other cross-sectional shapes, such as square or hexagonal, without departing from the scope of the present invention.

The outer surfaces of primary members 22 are formed from planar side surfaces 34 extending along a major portion of each side of the primary members. Adjacent side surfaces 34 are interconnected by arcuate recesses 36 in the form of a quarter circle of a size corresponding to the diameter of circular secondary members 24. It will be appreciated that if secondary members 24 are formed in shapes other than circular, the shape of recesses 36 could be constructed accordingly.

A plurality of slots 28 is formed along the length of each primary member 22. Each slot 28 extends generally parallel to the corresponding side surface 34 or recess 36 of the primary members. In addition, each slot 28 includes a mouth portion 38 formed from a pair of parallel sidewalls extending normally and inwardly from the side surfaces 34 and recesses 36 of the primary members to intersect with a generally circular-shaped base portion 40. The diameter of slot base portion 40 is larger than the width of slot mouth portion 38. Although primary members 22 are illustrated as having one slot 28 formed centrally along each side surface 34 and each recess 36, it will be appeciated that the number of slots and their locations may vary with the particular shape and size of the primary members. However, ideally the slots 28 are postioned so that they are in alignment with the corresponding slots of an adjacent primary member 22.

Referring specifically to FIGS. 2 and 3, a secondary member 24 is illustrated as being circular in cross section and of a diameter that is considerably smaller than the width of primary members 22. The reason for this difference in size is that secondary members 24 function essentially to interconnect a plurality of primary members 22, in the present situation from two to four primary members. As shown in FIG. 3, secondary member 24 is snugly receivable within the adjacent recesses 36 of the primary members. As noted above, secondary members 24 can be formed in other shapes, such as square or hexagonal, with the shape of recesses 38 being formed in conformity to the particular shape of secondary members 24.

As with primary members 22, secondary members 24 also include a plurality of slots 30 extending along the length of the secondary members, with the particular locations of slots 30 around the circumference of the secondary members being determined by the loation of slots 28 formed in recesses 36 of the primary members. As with slots 28, slots 30 include a mouth portion 42 defined by a pair of parallel sidewalls extending perpendicularly inwardly from the outer circumference of the secondary member to intersect with a generally circular base portion 44. The diameter of slot base portion 44 is larger than the width of slot mouth portion 42 to prevent removal of fastener member 26, as described more fully below.

Depending upon the shape and size of secondary members 24, it may be desirable to form the secondary members with a central bore, not shown, similar to bore 32 extending centrally through the primary members 22, thereby to reduce the weight of and the material needed to form the secondary members. The size of the central bore can be chosen to ensure that the bending and column strength of the secondary member are not significantly weakened.

Next, referring principally to FIGS. 3 through 6, the present invention also includes fastner members 26 that may be utilized to securely interconnect primary members 22 with each other and with secondary members 24. As shown most clearly in FIGS. 4 and 5, fastener members 26 are nominally rectangular in cross section with rounded side edges 46 and a solid central portion 48 to form a generally oblong configuration. The minor width or thickness of fastener members 26 is slightly smaller than the width of the mouth portions 38 and 42 of slots 28 and 30, respectively, thereby to conveniently engage within the slots, as shown in FIG. 5. A circular bore 50 extends through each side edge portion 46 of fastener members 26 to form the side edge portions in a hollow configuration. Preferably, bores 50 are concentric with the curvature of associated side edge portions 46.

To form a frame structure with primary and secondary members 22 and 24 and with fastener members 26, such as frame structure 20 shown in FIG. 3, a fastener member is placed within one slot 28 of a first primary member 22 and then a second primary member is positioned alongside the first primary member to also receive the fastener member in a corresponding slot. It will be appreciated that by properly locating slots 28, the slots of the primary members 22 will be in opposed alignment when the primary members are placed side-by-side to each other, as shown in FIG. 3, to cooperatively receive the fastener member. The recesses 36 of the primary members 22 cooperatively form a cavity for reception of a secondary member 24. The secondary members serve both to interconnect and reinforce adjacent primary members and are secured to the primary members by fastener members 26 in substantially the same manner in which the primary members are directly locked together by the fastener members. It will be appreciated that the locations of slots 28 in recesses 36 and slots 30 in secondary members 24 are selected so that they are in alignment with each other for cooperative reception of fastener members 26.

Once fastener members 26 are placed within the slots of the primary or secondary members desired to be fastened together, as illustrated in FIGS. 3 and 5, bores 50 are enlarged by drawing mandrel 52 through the bores, as schematically shown in FIG. 4. Preferably, mandrel 52 is shaped in the form of a circular ball of a diameter larger than bore 50 and is drawn through the bore by pulling on a line 54 anchored to the mandrel. Rather than utilizing a single mandrel 52 to enlarge bore 50 from the size illustrated in FIG. 5 to the size illustrated in FIG. 6, a series of mandrels, not shown, of different sizes may be drawn through bore 50 to progressively enlarge the bore until the side edge portion 46 of fastener member 26 completely fills the diameters of slot base portions 40 or 44, FIG. 6. By this enlargement of fastener members 26, primary members 22 and/or secondary members 24 are rigidly secured together without having to utilize welds, which may cause the primary members and secondary members to warp, or without bolts or screws, which often become loose. In addition, it will be appreciated that by forming slot base portions 40 and 44 in a circular cross section and by forming fastener members 26 with circular bores 50, the fastener members can be expanded not only with less effort, but also with smaller resultant stress risers being created in the fastener members than if the slot base portions and the fastener member bores are formed in other shapes, such as triangular or square.

Mandrel 52 may be pulled through bores 50 by a line 54. One end of line 54 is attached to the mandrel while the opposite end of the line is attached to a powered mechanism, such as a winch, not shown. Rather than utilizing mandrel 52, bores 50 may be expanded by utilizng pressurized hydraulic fluid, or a similar liquid medium. Once bores 50 have been expanded, if desired, they can be filled with molten metal, a liquid plastic or similar liquid material, which when solidified, reinforces the strength of the fastener members 26.

Preferably, fastener members 26 are constructed from a ductile but high-strength material so that once bores 50 are enlarged, the fastener members retain their shape, thereby to securely attach primary members 22 together. As such, the fastener members may be formed from high-strength, malleable aluminum or malleable steel, or a similar suitable alloy. Ideally, primary and secondary members 22 and 24 are formed from a high strength, flexible material that may be easily extruded through a die to economicaly form the members. An example of such a material is aluminum alloy.

Next referring to FIGS. 7-9, the present invention may be utilized to construct a structural framework 20' in any desired arcuate or formed shape. Framework 20' may be formed with structural members 22' constructed similarly to primary members 22 or with primary members formed in other cross-sectional shapes. Whatever shape is utilized for structural members 22', they also include a plurality of slots 28 and fastener members 26.

As a first step, fastener members 26 are placed within the oppositely adjacent, aligned slots 28 of structural members 22' and then the structural members are arranged in abutting, side-by-side relationship. Next, as illustrated in FIG. 8, the structural members are placed within a jig 56 that is composed of a plurality of actuators 57 which force structural members 22' against corresponding stops 58, thereby to flex the structural members into desired shape. As is common in the art, stops 58 may be positioned at desired locations to shape the structural members 22 to the desired form of framework 20'.

Next, mandrel 52 is pulled through bores 50 of fastener members 26 to enlarge the fastener members and cause them to occupy the entire volume of slots 28 in the manner discussed above, thereby to rigidly fasten structural members 22' together in the manner discussed above. Once the fastener members 26 have been enlarged, actuators 57 are retracted and structural members 22' are removed from jig 56. As illustrated in FIG. 9, the structural members retain the curved shape illustrated in FIG. 8 by virtue of the swaging of fastener members 26 that have taken on a permanent set. The natural resiliency of structural members 22' may cause framework 20' to straighten somewhat after removal from jig 56; however, the tendency of the structural members to straighten may be compensated for by appropriately overflexing the structural members in jig 56.

It will be appreciated that by the above-described construction and method, framework 20' may be formed in a desired curved shape without having to weld structural members 22' together, which avoids not only the creaction of high-level stress concentrations, but also warpage of structural members 22' due to the high welding heat. Also, as discussed above, once fastener member bores 50 have been enlarged, the bores may be filled with molen metal or liquid plastic and then solidified to reinforce the fastener members.

As will be apparent to those skilled in the art to which the invention is addressed, the present invention may be embodied in forms other than those specifically disclosed above without departing from the spirit or essential characteristics of the invention. The particular embodiments of the structural framewords 20 and 20', described above, are therefore to be considered in all respects as illustrative and not restrictive, i.e., the scope of the present invention is as set forth in the appended claims rather than being limited to the examples of the structural frameworks 20 and 20', as set forth in the foregoing description.

The embodiments of the invention in which an exclusive property or privilege is claimed are defined as follows:

1. A structural framework, comprising:
a plurality of elongate structural member means secured together in side-by-side relationship, each of said structural member means including a plurality of slots extending along the length of said structural member means with at least one of said slots in opposed alignment with a slot of an adjacent structural member means, each of said slots having a mouth portion intersecting an adjacent outer surface of said structural member means and a generally circular base portion intersecting the side of said slot mouth portion opposite said structural member means outer surface, said slot base portion in cross section being of a diameter larger than the width of said slot mouth portion; and
a unitary fastener member disposed within and extending between said aligned slots, said fastener member having a central portion of a width closely corresponding to the width of the mouth portions of the pair of aligned slots and generally circular end portions at each end of the central portion, each of said end portions being:
nominally, substantially smaller in diameter than the corresponding base portions of said structural member means slots; and,
defined by a generally circular, circumferentially continuous bore extending through each end portion and along the length of said fastener member, said bores being enlarged after insertion of said fastener member within said aligned slots thereby to expand said circular end portions to snugly occupy substantially the entire diameters of said base portions of said structural member means slots.

2. The structural framework according to claim 1, wherein the circumferential portion of each end portion bore facing toward the opposite bore has a wall thickness at least as great as the wall thickness of the circumferential portion of each bore facing away from the opposite bore.

3. A structural framework, comprising:
(a) a plurality of elongate structural member means secured together in side-by-side relationship, each of said structural member means including a plurality of slots extending along the length of said structural member means with at least one of said slots in opposed alignment with a slot of an adjacent structural member means, each of said slots havng a mouth portion intersecting an adjacent outer surface of said structural member means and a generally circular base portion intersecting the side of said slot mouth portion opposite said structural member means outer surface, said slot base portion in cross section being of a diameter larger than the width of said slot mouth portion;
(b) a unitary fastener member disposed within and extending between said aligned slots, said fastener member having a central portion of a width closely corresponding to the width of the mouth portions of the pair of aligned slots and hollow, generaly circular end portions at each end of the central portion, each of said end portions being:
nominally, substantially smaller in diameter than the corresponding base portions of said structural member means slots;
defined by a generally circular bore extending through the length of said fastener member; and,
enlarged after insertion of said fastener member within said aligned slots to snugly occupy substantially the entire diameter of the base portions of said structural member means slots; and,
(c) wherein said structural member means comprise:
a plurality of elongate primary structural members having side surfaces and a recess extending along the length of said side surfaces at the intersection of adjacent side surfaces, said recesses of adjacent primary structural members being in complementary relationship to each other and at least one of said slots extending along each of said recesses;
elongate secondary interconnection members simultaneously receivable within the recesses of a plurality of said primary members, said interconnection members:
being substantially smaller in cross section than said primary structural members; and,
having a plurality of said slots extending along their lengths, said interconnection member slots being in alignment with corresponding sots of a plurality adjacent primary members; and,
a fastener member disposed within said aligned complementary slot pairs of said plurality of primary members and said interconnection members to securely interconnect said members together in side-by-side relationship.

4. The structural member according to claim 2, wherein said primary member recesses generally defines a segment of a circle; and said interconnection members are generally circular in cross section.

5. The structural framework according to claim 2, wherein said primary members are centrally hollow.

6. A structural framework, comprising:
(a) wherein a plurality of elongate structural member means secured together in side-by-side relationship, each of said structural member means including a plurality of slots extending along the length of said structural member means with at least one of said slots in opposed alignment with a slot of an adjacent structural member means, each of said slots having a mouth portion intersecting an adjacent outer surface of said structural member means and a generally circular base portion intersecting the side of said slot mouth portion opposite said structural member means outer surface, said slot base portion in cross section being of a diameter larger than the width of said slot mouth portion;
(b) wherein a unitary fastener member disposed within and extending between said aligned slots, said fastener member having a central portion of a width closely corresponding to the width of the mouth portions of the pair of aligned slots and hollow, generally circular end portions at each end of the central portion, each of said end portions being:

nominally, substantially smaller in diameter than the corresponding base portions of said structural member means slots;

defined by a generally circular bore extending through the length of said fastener member; and, enlarged after insertion of said fastener member within said aligned slots to snugly occupy substantially the entire diameter of the base portions of said structural member means slots;

(c) wherein said elongate structural member means are nominally straight and are longitudinally flexed into a desired curvature; and, (d) wherein said circular end portions of said fastener means are enlarged to maintain said flexed structural member means in the desired curvature.

* * * * *

UNITED STATES PATENT AND TRADEMARK OFFICE
CERTIFICATE OF CORRECTION

PATENT NO. : 4,532,747
DATED : August 6, 1985
INVENTOR(S) : John R. Koetje

It is certified that error appears in the above-identified patent and that said Letters Patent is hereby corrected as shown below:

Column 1, line 67, "member.Each" should be --member. Each--

Column 2, line 61, "potions" should be --portions--

Column 3, line 16, "inteconnect" should be --interconnect--

Column 4, line 28, "postioned" should be --positioned-- line 50, "loation" should be --location

Column 5, line 2, "fastner" should be --fastener--

Column 6, line 6, "utilizng" should be --utilizing-- line 20, "economicaly" should be --economically-- line 63, "creaction" should be --creation-- line 67, "molen" should be --molten--

Column 7, line 6, "framewords" should be --frameworks--

Column 7, line 63, "havng" should be --having--
(Claim 3, line 8)

UNITED STATES PATENT AND TRADEMARK OFFICE
CERTIFICATE OF CORRECTION

PATENT NO. : 4,532,747

DATED : August 6, 1985

INVENTOR(S) : John R. Koetje

It is certified that error appears in the above-identified patent and that said Letters Patent is hereby corrected as shown below:

Column 8, line 7, "generaly" should be --generally--
(Claim 3, line 20)

Column 8, line 36, "sots" should be --slots--
(Claim 3, line 49)

Column 8, line 43, "2" should be --3--
(Claim 4, line 1)

Column 8, line 47, "2" should be --3--
(Claim 5, line 1)

Signed and Sealed this

Third Day of December 1985

[SEAL]

Attest:

DONALD J. QUIGG

Attesting Officer     Commissioner of Patents and Trademarks